(12) United States Patent
Halliday

(10) Patent No.: US 6,720,881 B1
(45) Date of Patent: Apr. 13, 2004

(54) PERIMETER SECURITY SYSTEM

(76) Inventor: Thomas W. Halliday, P.O. Box 158, Dingmans Ferry, PA (US) 18328-0158

( * ) Notice: Subject to any disclaimer, the term of this patent is extended or adjusted under 35 U.S.C. 154(b) by 0 days.

(21) Appl. No.: 10/103,941

(22) Filed: Mar. 22, 2002

(51) Int. Cl.[7] .................. G08B 23/00; A01K 15/04
(52) U.S. Cl. .................. 340/573.4; 340/573.3; 340/573.6; 340/573.9; 119/721
(58) Field of Search .................. 340/573.3, 573.4, 340/573.6, 572.9; 119/721

(56) References Cited

U.S. PATENT DOCUMENTS

| | | | |
|---|---|---|---|
| 4,136,338 A | * | 1/1979 | Antenore .................. 340/551 |
| 4,694,285 A | * | 9/1987 | Scripps .................. 340/693.2 |
| 4,745,882 A | * | 5/1988 | Yarnall et al. .................. 119/721 |
| 4,973,944 A | * | 11/1990 | Maletta .................. 340/568.1 |
| 5,053,768 A | * | 10/1991 | Dix, Jr. .................. 340/988 |
| 5,086,391 A | * | 2/1992 | Chambers .................. 340/573.1 |
| 5,272,466 A | * | 12/1993 | Venczel .................. 340/573.3 |
| 5,337,041 A | * | 8/1994 | Friedman .................. 340/573.4 |
| 5,408,222 A | | 4/1995 | Yaffe et al. |
| 5,471,199 A | * | 11/1995 | Yuan .................. 340/574 |
| 5,486,814 A | | 1/1996 | Quinones |
| D374,190 S | | 10/1996 | Yuen |
| 5,619,187 A | | 4/1997 | Serfontein |
| 5,748,080 A | | 5/1998 | Clay |
| 5,769,032 A | * | 6/1998 | Yarnall et al. .................. 119/721 |
| 5,793,290 A | * | 8/1998 | Eagleson et al. .................. 340/573.4 |
| 5,821,874 A | | 10/1998 | Parvulescu et al. |
| 5,844,489 A | * | 12/1998 | Yarnall et al. .................. 340/573.3 |
| 5,883,577 A | * | 3/1999 | Jordan et al. .................. 340/628 |
| 6,057,764 A | * | 5/2000 | Williams .................. 340/572.1 |
| 6,084,976 A | * | 7/2000 | Lin .................. 381/380 |
| 6,198,390 B1 | * | 3/2001 | Schlager et al. .................. 340/984 |
| 2001/0030610 A1 | * | 10/2001 | Rochelle et al. .................. 340/686.6 |
| 2001/0040508 A1 | * | 11/2001 | Janning et al. .................. 340/573.3 |
| 2002/0021231 A1 | * | 2/2002 | Schlager et al. .................. 340/984 |

* cited by examiner

*Primary Examiner*—Jeffery Hofsass
*Assistant Examiner*—Anne V. Lai

(57) ABSTRACT

A perimeter security system for providing a security alarm for people leaving or entering a predetermined area. The perimeter security system includes a main sensor unit, wearable by a user, which provides an alarm if the wearer breaks a boundary of the predefined area; a perimeter defining assembly for providing an indication of the boundary of the predefined area; and a remote unit for receiving a signal from the main sensor unit that the boundary of the predefined area has been broken, which provides an alarm for a caretaker.

17 Claims, 4 Drawing Sheets

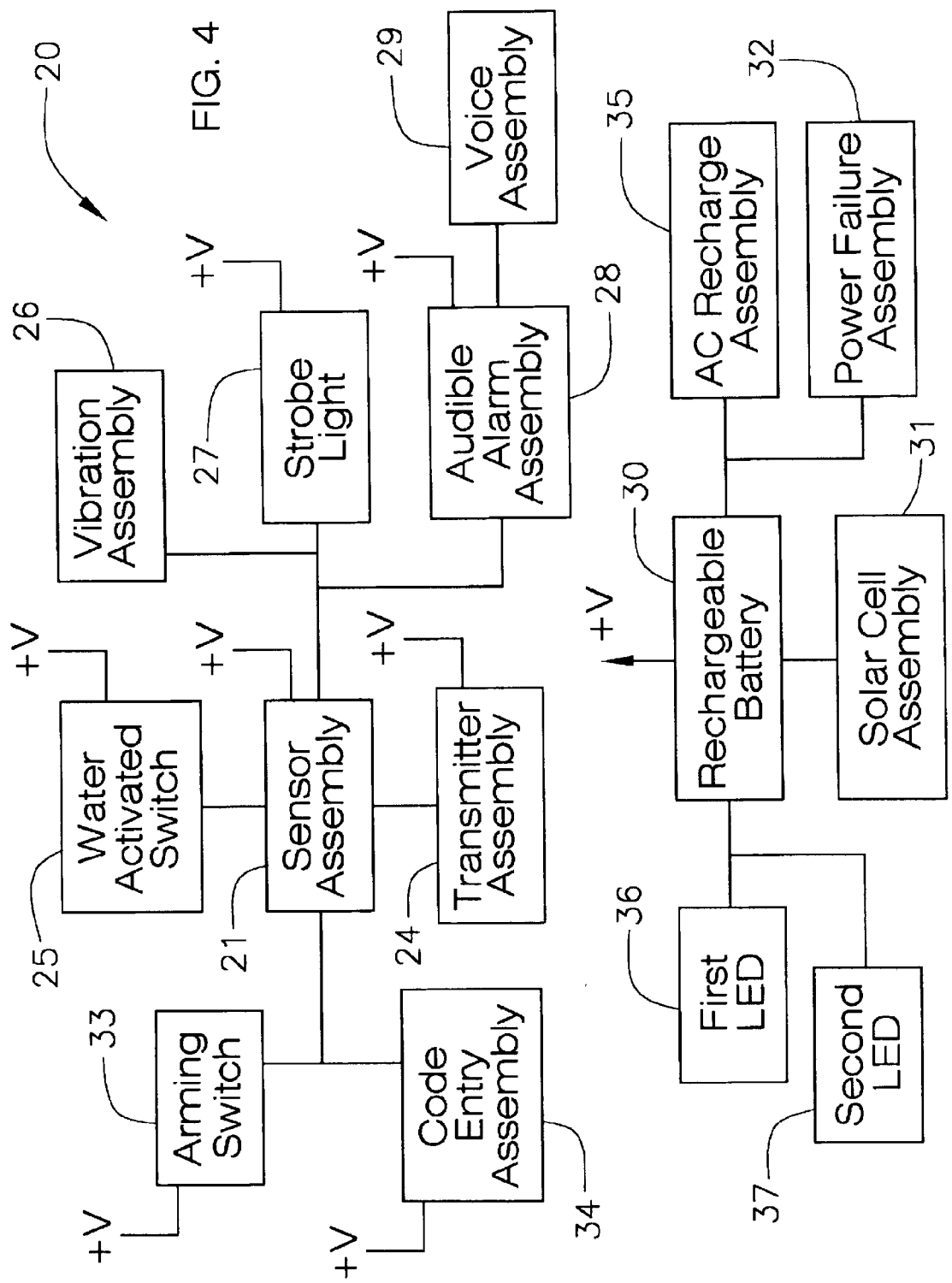

PERIMETER SECURITY SYSTEM

BACKGROUND OF THE INVENTION

1. Field of the Invention

The present invention relates to perimeter alarms and more particularly pertains to a new perimeter security system for providing a security alarm for people leaving or entering a predetermined area.

2. Description of the Prior Art

The use of perimeter alarms is known in the prior art. More specifically, perimeter alarms heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,486,814; 5,619,187; 5,408,222; 5,748,080; 5,821,874; and Des. 374,190.

While these devices fulfill their respective, particular objectives and requirements, the aforementioned patents do not disclose a new perimeter security system. The inventive device includes a main sensor unit, wearable by a user, which provides an alarm if the wearer breaks a boundary of the predefined area; a perimeter defining assembly for providing an indication of the boundary of the predefined area; and a remote unit for receiving a signal from the main sensor unit that the boundary of the predefined area has been broken, which provides an alarm for a caretaker.

In these respects, the perimeter security system according to the present invention substantially departs from the conventional concepts and designs of the prior art, and in so doing provides an apparatus primarily developed for the purpose of providing a security alarm for people leaving or entering a predetermined area.

SUMMARY OF THE INVENTION

In view of the foregoing disadvantages inherent in the known types of perimeter alarms now present in the prior art, the present invention provides a new perimeter security system construction wherein the same can be utilized for providing a security alarm for people leaving or entering a predetermined area.

The general purpose of the present invention, which will be described subsequently in greater detail, is to provide a new perimeter security system apparatus and method which has many of the advantages of the perimeter alarms mentioned heretofore and many novel features that result in a new perimeter security system which is not anticipated, rendered obvious, suggested, or even implied by any of the prior art perimeter alarms, either alone or in any combination thereof.

To attain this, the present invention generally comprises a main sensor unit, wearable by a user, which provides an alarm if the wearer breaks a boundary of the predefined area; a perimeter defining assembly for providing an indication of the boundary of the predefined area; and a remote unit for receiving a signal from the main sensor unit that the boundary of the predefined area has been broken, which provides an alarm for a caretaker.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new perimeter security system apparatus and method which has many of the advantages of the perimeter alarms mentioned heretofore and many novel features that result in a new perimeter security system which is not anticipated, rendered obvious, suggested, or even implied by any of the prior art perimeter alarms, either alone or in any combination thereof.

It is another object of the present invention to provide a new perimeter security system which may be easily and efficiently manufactured and marketed.

It is a further object of the present invention to provide a new perimeter security system which is of a durable and reliable construction.

An even further object of the present invention is to provide a new perimeter security system which is susceptible of a low cost of manufacture with regard to both materials and labor, and which accordingly is then susceptible of low prices of sale to the consuming public, thereby making such perimeter security system economically available to the buying public.

Still yet another object of the present invention is to provide a new perimeter security system which provides in the apparatuses and methods of the prior art some of the advantages thereof, while simultaneously overcoming some of the disadvantages normally associated therewith.

Still another object of the present invention is to provide a new perimeter security system for providing a security alarm for people leaving or entering a predetermined area.

Yet another object of the present invention is to provide a new perimeter security system which includes a main sensor unit, wearable by a user, which provides an alarm if the wearer breaks a boundary of the predefined area; a perimeter defining assembly for providing an indication of the boundary of the predefined area; and a remote unit for receiving a signal from the main sensor unit that the boundary of the predefined area has been broken, which provides an alarm for a caretaker.

Still yet another object of the present invention is to provide a new perimeter security system that helps protect small children from dangers such as swimming pools and busy streets Even still another object of the present invention is to provide a new perimeter security system that can be used to prevent adults from leaving restricted areas.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic functional interconnect diagram of the main sensor unit of the present invention.

DESCRIPTION OF THE PREFERRED EMBODIMENT

Figure 1:
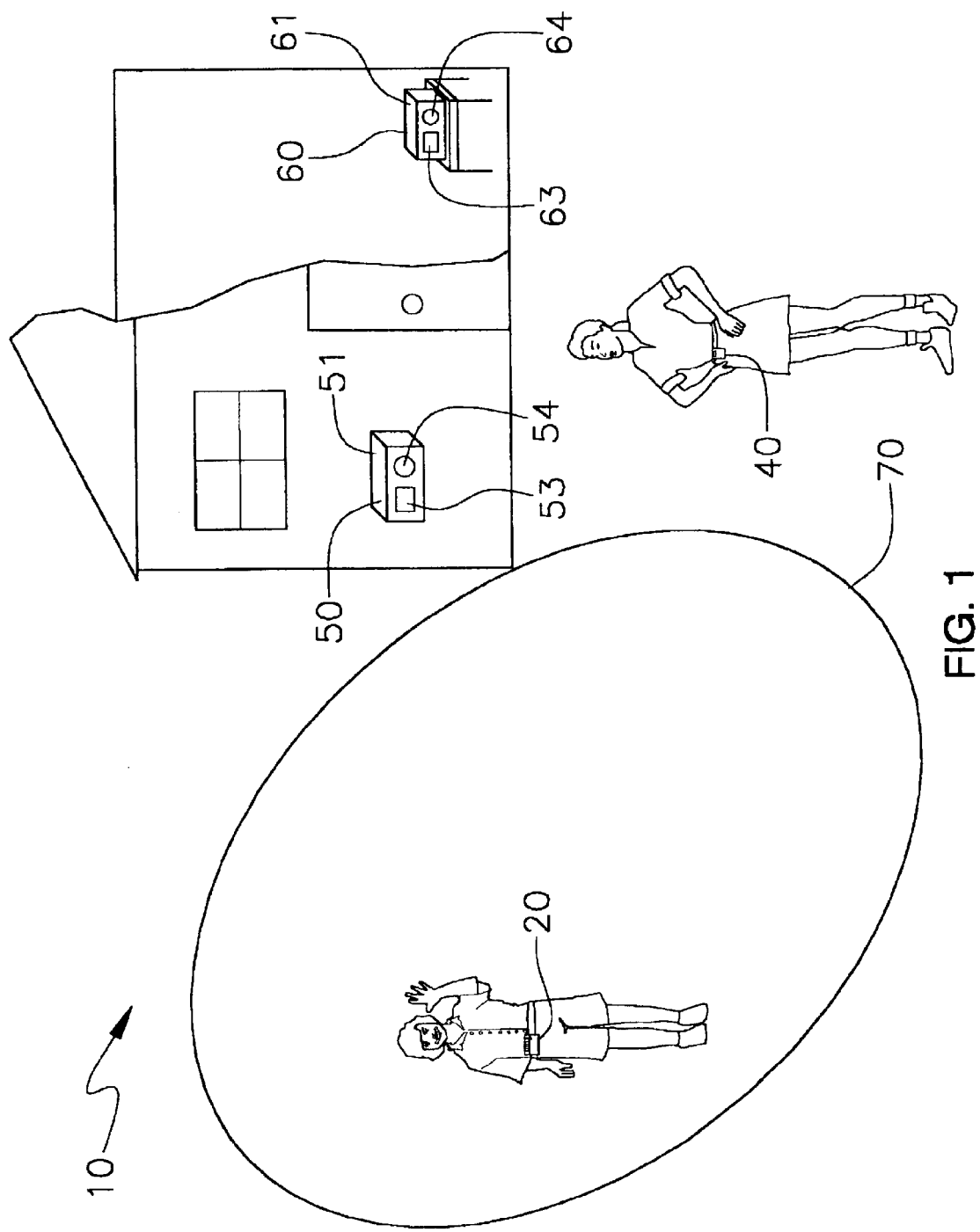
FIG. 1 is a schematic perspective view of a new perimeter security system according to the present invention.
Figure 2:
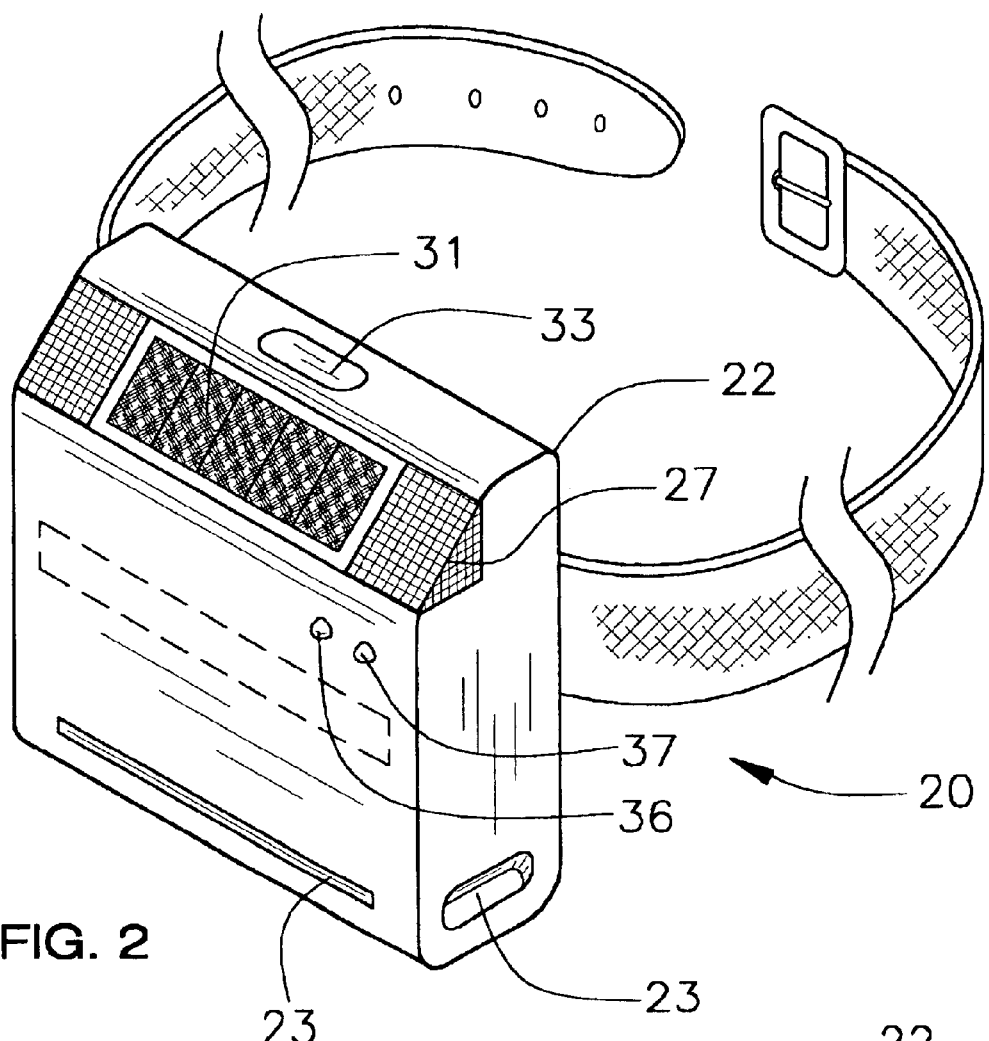
FIG. 2 is a schematic perspective view of the main sensor unit of the present invention.
Figure 3:
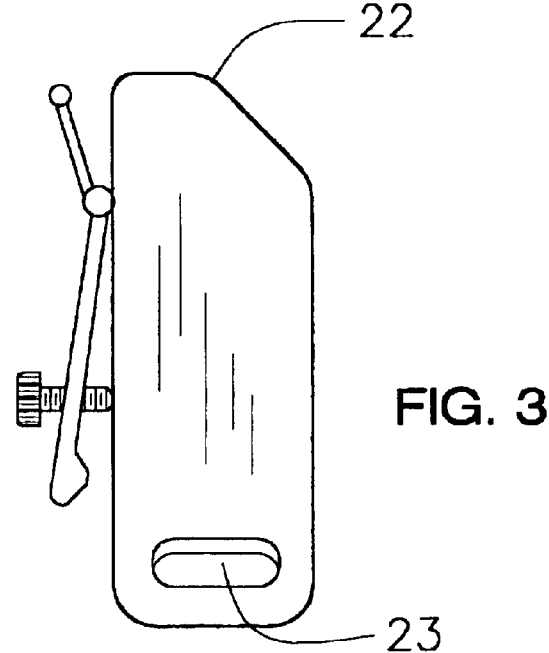
FIG. 3 is a schematic side view of the main sensor unit of the present invention.
Figure 6:
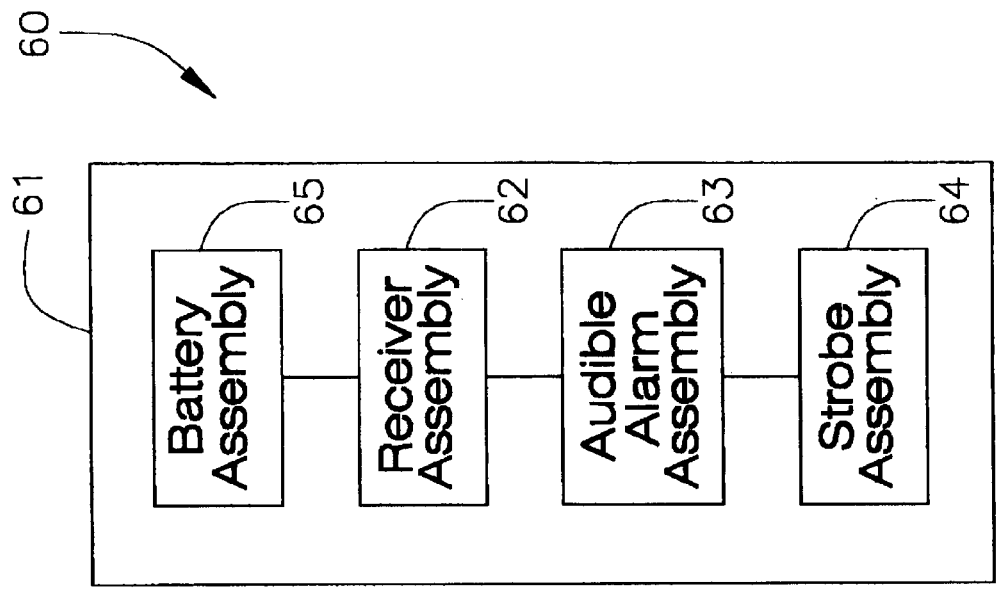
FIG. 6 is a schematic functional interconnect diagram of the second remote unit of the present invention.
Figure 5:
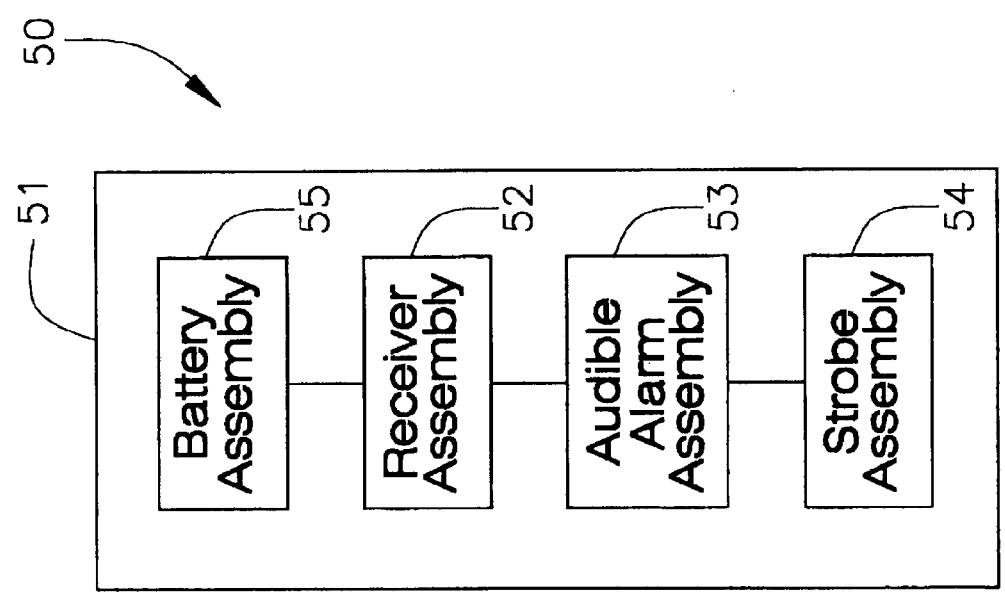
FIG. 5 is a schematic functional interconnect diagram of the remote unit of the present invention.

With reference now to the drawings, and in particular to FIGS. 1 through 6 thereof, a new perimeter security system embodying the principles and concepts of the present invention and generally designated by the reference numeral 10 will be described.

As best illustrated in FIGS. 1 through 6, the perimeter security system 10 generally comprises a main sensor unit 20, a perimeter defining assembly 70, and a remote receiving unit 50.

The main sensor unit 20 is preferably wearable by a user. The main sensor unit 20 provides an alarm if the wearer breaks a boundary of a predefined area.

The perimeter defining assembly 70 provides an indication of the boundary of the predefined area.

The remote unit 50 receives a signal from the main sensor unit 20 that the boundary of the predefined area has been broken when the main sensor unit 20 passes the perimeter defining assembly 70. The remote unit 50 provides an alarm for a caretaker.

In an embodiment, the main sensor unit 20 further comprises a housing 22, sensor assembly 21, transmitter assembly 24, water activated switch 25, vibration assembly 26, at least one strobe light 27 and an audible alarm assembly 28.

The housing 22 is preferably wearable by the user. The sensor assembly 21 is positioned substantially within the housing 22. The sensor 21 detects when the main sensor unit 20 passes the perimeter defining assembly 70. The transmitter assembly 24 is used for sending a signal to the remote unit 50 indicating the main sensor unit 20 has broken the boundary of the predefined area. The water activated switch 25 facilitates activating an alarm when the main sensor unit 20 contacts water. The housing 22 includes at least one aperture 23 for facilitating water flow to the water activated switch 25 when the main sensor unit 20 contacts water. Preferably, the interior of the housing 22 is divided into two portions: a first portion for the water activated switch 25 and a substantially water-proof portion for the remaining parts of the main sensor unit 20. The vibration assembly 26 provides a tactile alarm to the user when the boundary of the predetermined area is broken such that the user is aware of the violation of the boundary and may return to an appropriate area. The strobe light 27 is positioned on an exterior surface of the housing 22 such that the strobe light 27 is visible when activated. The strobe light 27 is activated when the boundary of the predetermined area is broken facilitating visual location of the user. The audible alarm assembly 28 is used to provide an aural alarm to the user when the boundary of the predetermined area is broken such that the user is aware of the violation of the boundary and may return to an appropriate area.

In a further embodiment, the audible alarm assembly 28 further comprises a voice assembly 29 for presenting a prerecorded warning message to the user when the boundary of the predetermined area has been broken.

In still a further embodiment the main sensor unit 20 further comprises a rechargeable battery member 30, a solar cell assembly 31, and a power failure assembly 32. The rechargeable battery member 30 provides electrical energy to the main sensor unit 20. The rechargeable battery member 30 is positioned substantially within the housing 22. The solar cell assembly 31 is preferably positioned on an exterior portion of the housing 22. The solar cell assembly 31 provides supplemental electrical energy to the main sensor unit 20. The solar cell assembly 31 is operationally coupled to the rechargeable battery member 30 such that the solar cell assembly 31 provides a recharging current to the rechargeable battery member 30. The power failure assembly 32 detects the rechargeable battery member 30 failing. The power failure assembly 32 is operationally coupled to the rechargeable battery member 30. The power failure assembly 32 is positioned substantially within the housing 22.

In still yet a further embodiment, the main sensor unit 20 further comprises an arming switch 33 and a code entry assembly 34. The arming switch 33 is used for activating the main sensor unit 20. The code entry assembly 34 selectively disarms the main sensor unit 20. The code entry assembly 34 is positioned on an exterior surface of the main sensor unit 20. The code entry assembly 34 is for deactivating an alarm signal from the main sensor unit 20. Preferably, the code entry system uses a predetermined series of alphanumeric characters to deactivate the alarm signal.

In a further embodiment, the code entry system 34 is for disabling the main sensor unit 20 for a predetermined time and the main sensor unit 20 automatically reactivates after the predetermined time. Preferably the predetermined period of time is approximately 30 minutes.

In still a further embodiment, the main sensor unit 20 further comprises an alternating current recharging assembly 35 for recharging the rechargeable battery member 30 from a standard household 110 volt outlet.

In an embodiment, the remote unit 50 further comprises a remote housing 51, a receiver assembly 52, an audible alarm assembly 53, a strobe assembly 54 and a battery assembly 55. The remote housing 51 is mountable to an exterior portion of a structure. The receiver assembly 50 is for receiving a signal from the main sensor unit 20 when the main sensor unit 20 breaks a boundary of a predetermined area. The audible alarm assembly 53 is operationally coupled to the receiver assembly 52. The audible alarm assembly 53 is activated when the receiver assembly 52 receives a signal from the main sensor unit 20. The audible alarm assembly 53 is for alerting a caretaker that the user has violated the boundary. The strobe assembly 54 is also operationally coupled to the receiver assembly 52. The strobe assembly 54 is positioned on an exterior surface of the housing 51. The strobe assembly 54 provides a visible alarm when the receiver assembly 52 receives a signal from the main sensor unit 20 for alerting a caretaker that the user has violated the boundary. The battery assembly 55 is positioned substantially within the housing 51. The battery assembly 55 is operationally coupled to the receiver assembly 52, audible alarm assembly 53, and strobe assembly 54. The battery assembly 55 provides electrical energy for the remote unit 50.

In a further embodiment, the audible alarm assembly 53 provides an audible alarm of approximately 103 decibels.

A second remote unit 60 may also be used in the system 10. The second remote unit 60 is also for receiving a signal from the main sensor unit 20 that the boundary of the predefined area has been broken. Similar to the remote unit 50 the second remote unit 60 further comprises a remote housing 61, receiver assembly 62, audible alarm assembly 63, strobe assembly 64, and battery assembly 65. The housing 61 is designed to place anywhere within a structure. The receiver assembly 62 is also for receiving a signal from the main sensor unit 20 when the main sensor unit breaks a boundary of a predetermined area. The audible alarm assembly 63 is operationally coupled to the receiver assembly 62. The audible alarm assembly 63 is activated when the receiver assembly 62 receives a signal from the main sensor unit 20. The audible alarm assembly 63 is for alerting a caretaker that the user has violated the boundary. The strobe assembly 64 is operationally coupled to the receiver assembly 62 and is positioned on an exterior surface of the housing 61. The strobe assembly 64 provides a visible alarm when the receiver assembly 62 receives a signal from the main sensor unit 20 for alerting a caretaker that the user has violated the boundary. The battery assembly 65 is positioned substantially within the housing 61 and is operationally coupled to the receiver assembly 62, audible alarm assembly 63, and strobe assembly 64. The battery assembly 65 provides electrical energy for the second remote unit 60.

In an embodiment the audible alarm assembly of the second remote unit 60 provides an audible alarm of approximately 103 decibels.

A caretaker pager assembly 40 provides an alarm to a caretaker that the user has violated the boundary of the predetermined area, in addition to the remote 50 and second remote units 60. The caretaker pager 40 is wearable by a caretaker for facilitating mobility of the caretaker.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A perimeter security system for excluding a person from or maintaining a person within a predefined area comprising:

a main sensor unit being wearable by a user, said main sensor unit providing an alarm if the wearer breaks a boundary of the predefined area;

a perimeter defining assembly for providing an indication of the boundary of the predefined area;

a remote unit receiving a signal from said main sensor unit that the boundary of the predefined area has been broken, said remote unit providing an alarm for a caretaker;

said remote unit further comprises:

a remote housing, said housing being mountable to an exterior portion of a structure;

a receiver assembly for receiving a signal from said main sensor unit when said main sensor unit breaks a boundary of a predetermined area;

an audible alarm assembly operationally coupled to said receiver assembly, said audible alarm assembly being activated when said receiver assembly receives a signal from said main sensor unit, said audible alarm assembly being for alerting a caretaker that the user has violated the boundary;

a strobe assembly operationally coupled to said receiver assembly, said strobe assembly being positioned on an exterior surface of said housing; said strobe assembly providing a visible alarm when said receiver assembly receives a signal from said main sensor unit for alerting a caretaker that the user has violated the boundary;

a battery assembly positioned substantially within said housing, said battery assembly being operationally coupled to said receiver assembly, said audible alarm assembly, and said strobe assembly, said battery assembly providing electrical energy for said remote unit;

wherein said audible alarm assembly provides an audible alarm of approximately 103 decibels; and wherein said perimeter defining assembly further comprises a coil of wire positioned around the perimeter of the predetermined area, said coil of wire being operationally coupled to an electrical source, said coil of wire generating a magnetic field detectable by said main sensor unit such that when main sensor unit passes said coil of wire said main sensor unit issues an alarm signal.

2. The system of claim 1, wherein said main sensor unit further comprises:

a housing, said housing being wearable by the user;

a sensor assembly being positioned substantially within said housing, said sensor detecting said main sensor unit passing said perimeter defining assembly; and a transmitter assembly for sending a signal to said remote unit indicating said main sensor unit has broken the boundary of the predefined area.

3. The system of claim 2, wherein said main sensor unit further comprises:

a water activated switch for facilitating activating an alarm when said main sensor unit contacts water;

said housing having at least one aperture for facilitating water flow to said water activated switch when said main sensor unit contacts water.

4. The system of claim 2, wherein said main sensor unit further comprises a vibration assembly for providing a tactile alarm to the user when the boundary of the predetermined area is broken such that the user is aware of the violation of the boundary and may return to an appropriate area.

5. The system of claim 2, wherein said main sensor unit further comprises at least one strobe light positioned on an exterior surface of said housing such that said strobe light is visible when activated, said strobe light being activated when the boundary of the predetermined area is broken facilitating visual location of the user.

6. The system of claim 2, wherein said main sensor unit further comprises an audible alarm assembly for providing an aural alarm to the user when the boundary of the predetermined area is broken such that the user is aware of the violation of the boundary and may return to an appropriate area.

7. The system of claim 6, wherein said audible alarm assembly further comprises a voice assembly for presenting a prerecorded warning message to the user when the boundary of the predetermined area has been broken.

8. The system of claim 2, wherein said main sensor unit further comprises:

a rechargeable battery member for providing electrical energy to said main sensor unit, said rechargeable battery member being positioned substantially within said housing;

a solar cell assembly positioned on an exterior portion of said housing, said solar cell assembly providing supplemental electrical energy to said main sensor unit, said solar cell assembly being operationally coupled to said rechargeable battery member such that said solar cell assembly provides a recharging current to said rechargeable battery member;

a power failure assembly for detecting said rechargeable battery member failing, said power failure assembly being operationally coupled to said rechargeable battery member, said power failure assembly being positioned substantially within said housing; and an arming switch for activating said main sensor unit.

9. The system of claim 8, wherein said main sensor unit further comprises a code entry assembly for selectively disarming said main sensor unit, said code entry assembly being positioned on an exterior surface of said main sensor unit, said code entry assembly being for deactivating an alarm signal from said main sensor unit, said code entry system using a predetermined series of alphanumeric characters to deactivate said alarm signal.

10. The system of claim 9, wherein said code entry system being for disabling said main sensor unit for a predetermined time, said main sensor unit automatically reactivating after said predetermined time.

11. The system of claim 8, wherein said main sensor unit further comprises an alternating current recharging assembly for recharging said rechargeable battery member from a standard household 110 volt outlet.

12. The system of claim 1, wherein said perimeter security system further comprises:

a second remote unit for receiving a signal from said main sensor unit that the boundary of the predefined area has been broken;

said second remote unit further comprising:

a remote housing, said housing being adapted to place anywhere within a structure;

a receiver assembly for receiving a signal from said main sensor unit when said main sensor unit breaks a boundary of a predetermined area;

an audible alarm assembly operationally coupled to said receiver assembly, said audible alarm assembly being activated when said receiver assembly receives a signal from said main sensor unit, said audible alarm assembly being for alerting a caretaker that the user has violated the boundary;

a strobe assembly operationally coupled to said receiver assembly, said strobe assembly being positioned on an exterior surface of said housing; said strobe assembly providing a visible alarm when said receiver assembly receives a signal from said main sensor unit for alerting a caretaker that the user has violated the boundary;

a battery assembly positioned substantially within said housing, said battery assembly being operationally coupled to said receiver assembly, said audible alarm assembly, and said strobe assembly, said battery assembly providing electrical energy for said remote unit.

13. The system of claim 12, wherein said audible alarm assembly provides an audible alarm of approximately 103 decibels.

14. The system of claim 1, further comprising a caretaker pager assembly for providing an alarm to a caretaker that the user has violated the boundary of the predetermined area, said caretaker pager being wearable by a caretaker for facilitating mobility of the caretaker.

15. A perimeter security system for excluding a person from or maintaining a person within a predefined area comprising:

a main sensor unit being wearable by a user, said main sensor unit providing an alarm if the wearer breaks a boundary of the predefined area;

a perimeter defining assembly for providing an indication of the boundary of the predefined area; and a remote unit receiving a signal from said main sensor unit that the boundary of the predefined area has been broken, said remote unit providing an alarm for a caretaker.

wherein said main sensor unit further comprises:

a housing, said housing being wearable by the user;

a sensor assembly being positioned substantially within said housing, said sensor detecting said main sensor unit passing said perimeter defining assembly; and a transmitter assembly for sending a signal to said remote unit indicating said main sensor unit has broken the boundary of the predefined area;

a water activated switch for facilitating activating an alarm when said main sensor unit contacts water;

said housing having at least one aperture for facilitating water flow to said water activated switch when said main sensor unit contacts water;

a vibration assembly for providing a tactile alarm to the user when the boundary of the predetermined area is broken such that the user is aware of the violation of the boundary and may return to an appropriate area;

at least one strobe light positioned on an exterior surface of said housing such that said strobe light is visible when activated, said strobe light being activated when the boundary of the predetermined area is broken facilitating visual location of the user;

an audible alarm assembly for providing an aural alarm to the user when the boundary of the predetermined area is broken such that the user is aware of the violation of the boundary and may return to an appropriate area;

wherein said audible alarm assembly further comprises a voice assembly for presenting a prerecorded warning message to the user when the boundary of the predetermined area has been broken;

a rechargeable battery member for providing electrical energy to said main sensor unit, said rechargeable battery member being positioned substantially within said housing;

a solar cell assembly positioned on an exterior portion of said housing, said solar cell assembly providing supplemental electrical energy to said main sensor unit, said solar cell assembly being operationally coupled to said rechargeable battery member such that said solar cell assembly provides a recharging current to said rechargeable battery member;

a power failure assembly for detecting said rechargeable battery member failing, said power failure assembly being operationally coupled to said rechargeable battery member, said power failure assembly being positioned substantially within said housing; and an arming switch for activating said main sensor unit.

a code entry assembly for selectively disarming said main sensor unit, said code entry assembly being positioned on an exterior surface of said main sensor unit, said code entry assembly being for deactivating an alarm signal from said main sensor unit, said code entry system using a predetermined series of alphanumeric characters to deactivate said alarm signal;

wherein said code entry system being for disabling said main sensor unit for a predetermined time, said main sensor unit automatically reactivating after said predetermined time;

wherein said main sensor unit further comprises an alternating current recharging assembly for recharging said rechargeable battery member from a standard household 110 volt outlet;

wherein said remote unit further comprises:
a remote housing, said housing being mountable to an exterior portion of a structure;
a receiver assembly for receiving a signal from said main sensor unit when said main sensor unit breaks a boundary of a predetermined area;
an audible alarm assembly operationally coupled to said receiver assembly, said audible alarm assembly being activated when said receiver assembly receives a signal from said main sensor unit, said audible alarm assembly being for alerting a caretaker that the user has violated the boundary;
a strobe assembly operationally coupled to said receiver assembly, said strobe assembly being positioned on an exterior surface of said housing; said strobe assembly providing a visible alarm when said receiver assembly receives a signal from said main sensor unit for alerting a caretaker that the user has violated the boundary;
a battery assembly positioned substantially within said housing, said battery assembly being operationally coupled to said receiver assembly, said audible alarm assembly, and said strobe assembly, said battery assembly providing electrical energy for said remote unit;
wherein, said audible alarm assembly provides an audible alarm of approximately 103 decibels;
a second remote unit for receiving a signal from said main sensor unit that the boundary of the predefined area has been broken;
said second remote unit further comprising:
a remote housing, said housing being adapted to place anywhere within a structure;
a receiver assembly for receiving a signal from said main sensor unit when said main sensor unit breaks a boundary of a predetermined area;
an audible alarm assembly operationally coupled to said receiver assembly, said audible alarm assembly being activated when said receiver assembly receives a signal from said main sensor unit, said audible alarm assembly being for alerting a caretaker that the user has violated the boundary;
a strobe assembly operationally coupled to said receiver assembly, said strobe assembly being positioned on an exterior surface of said housing; said strobe assembly providing a visible alarm when said receiver assembly receives a signal from said main sensor unit for alerting a caretaker that the user has violated the boundary;
a battery assembly positioned substantially within said housing, said battery assembly being operationally coupled to said receiver assembly, said audible alarm assembly, and said strobe assembly, said battery assembly providing electrical energy for said remote unit;
wherein said audible alarm assembly provides an audible alarm of approximately 103 decibels;
a caretaker pager assembly for providing an alarm to a caretaker that the user has violated the boundary of the predetermined area, said caretaker pager being wearable by a caretaker for facilitating mobility of the caretaker.

16. The system of claim 15, wherein said main sensor unit further comprises:
a first led member for providing a visual indication of an adequately charged rechargeable battery, said first led member being positioned substantially on an exterior surface of said main sensor unit such that said first led member being visible by the user;
a second led member for providing a visual indication of an inadequately charged rechargeable battery, said second led member being positioned substantially on an exterior surface of said main sensor unit such that said second led member being visible by the user, said second led member being positioned substantially adjacent to said first led member;
wherein said first and second led members having differently colored lenses such that said first and second led members being easily distinguishable by color.

17. The system of claim 15, wherein said main sensor unit being securable to the user such that the user cannot remove said main sensor unit without assistance from the caretaker.

* * * * *